INVENTOR
LAWRENCE A. WESTHAVER

BY Semmes & Semmes
ATTORNEYS

Dec. 30, 1969    L. A. WESTHAVER    3,486,821
SYSTEM FOR INTEGRATING LIGHT ENERGY
Filed May 26, 1967    2 Sheets-Sheet 2

INVENTOR
LAWRENCE A. WESTHAVER

BY Semmes & Semmes
ATTORNEYS

United States Patent Office 3,486,821
Patented Dec. 30, 1969

3,486,821
SYSTEM FOR INTEGRATING LIGHT ENERGY
Lawrence A. Westhaver, Laurel, Md., assignor of one-half to Martin Strauss, Washington, D.C.
Filed May 26, 1967, Ser. No. 641,560
Int. Cl. G01n *21/22*
U.S. Cl. 356—72       6 Claims

ABSTRACT OF THE DISCLOSURE

A system for measuring the amount of light energy per unit area impinging on the film plane within a camera during a shutter operation wherein a field effect transistor circuit embodying a light integrator, energy storage, and measuring portion is employed.

BACKGROUND OF THE INVENTION

Field of the invention

Optics, particularly measuring the amount of light hitting a camera film plane during operation of the camera shutter in order to determine whether an automatic camera is providing correct average exposure of the film.

Description of prior art

Related techniques are treated in the following prior art references, Ost 2,944,190.

Ost's light measuring device is designed for measurement of external surfaces such as engraving plates to be photographed rather than the film plane within a camera and includes a photo cell and vacuum tube. Principal shortcomings of this arrangement include the high voltage requirement for operation, the relative bulk of the photo cell (approximately ½″ x 3″) which would preclude its positioning within most cameras, and the curvature of the photo cell cathode which prevents positioning of the photo sensing element directly in the film plane. Also, Ost calculates that the dark current is zero. Applicant's system is based upon the premise that there is a constant dark current which is required to be cancelled out in order to obtain accurate measurement.

SUMMARY OF THE INVENTION

Conventionally, cadmium sulphide cells are used to measure the light level at the film plane with the shutter held open. This level can be used to indicate whether the automatic aperture control is set for proper exposure for a particular speed. This light level check does not guarantee that the camera will expose properly since exposure is a function of light level and shutter speed. Proper exposure should be determined by integrating the light energy per unit area of film that is admitted during a shutter operation. The requirements of the sensing device are ability to respond fast enough to track the rise and fall of the pulse of light, adequate sensitivity to respond to the low light levels encountered and sufficiently small size that it can be mounted conveniently in the camera to be tested. Photo tubes and photo multiplier tubes have inadequate response and sensitivity but are too large to mount in the film plane of most cameras. Cadmium sulphide cells, while sufficiently small, have very slow responses and therefore can not track a pulse.

According to the present invention, a field effect transistor circuit is employed to both integrate the light energy impinging on the sensor and to measure the integrated quantity. The field effect transistor is relatively inexpensive and because of its diminutive size is readily mountable within the film plane of a conventional camera.

The sensing and integrating portion of the circuit embodies one photosensitive field effect transistor (FOTOFET) and one conventional junction field effect transistor (FET). Under dark conditions the current from the FOTOFET is cancelled by the current from the junction FET. A pulse of light striking the FOTOFET increases the current through the transistor proportional to the instantaneous light intensity. The current pulse is shunted into a storage capacitor. The third and fourth FETS are connected in a simple electrometer bridge configuration which is used to measure the voltage on the storage capacitor which voltage represents the total amount of light energy striking the sensor.

BRIEF DEECRIPTION OF THE DRAWINGS

DESCRIPTION OF THE PREFERRED EMBODIMENTS

The light energy integrating circuit is designed to integrate, or sum up, the light energy falling on a given area on the film plane during a shutter operation. That area is the area of the FOTOSET in the sense head.

If an automatic camera is held in a fixed position before a panel of uniform illuminance such that the angle of view of the lens and the light sensor is filled by the panel, the camera aperture control should set the aperture so that a certain quantity of light energy reaches a given area on the film plane with a shutter operation. This quantity of light energy is the nominal amount necessary to expose the given area of film properly. The actual quantity of light energy is dependent on the ASA rating of the film and the area of film to be exposed.

The light sensing head of the testing circuit, including field effect transistor 10 and resistor 16, is placed at the film plane of the camera to be tested. Since the area of the light sensing head is fixed, the quantity of light energy it should intercept in a properly adjusted camera is solely determined by the ASA setting of the camera.

A camera may have an aperture control that tends to overexpose and a shutter which is fast and tends to underexpose. These errors may compensate for each other and the camera may yield satisfactory exposures. In most cases the camera user is interested only in proper exposure.

The present testing circuit cannot determine whether an exposure error is the fault of the shutter or of the aperture control. However, the testing circuit can determine effectively whether or not there is an exposure error.

If an error is indicated the camera should be run through a shutter check. If the shutter checks out properly, then the aperture control is faulty and the repair or calibration of the aperture control can be rechecked by the present testing circuit.

Figures 1, 2:
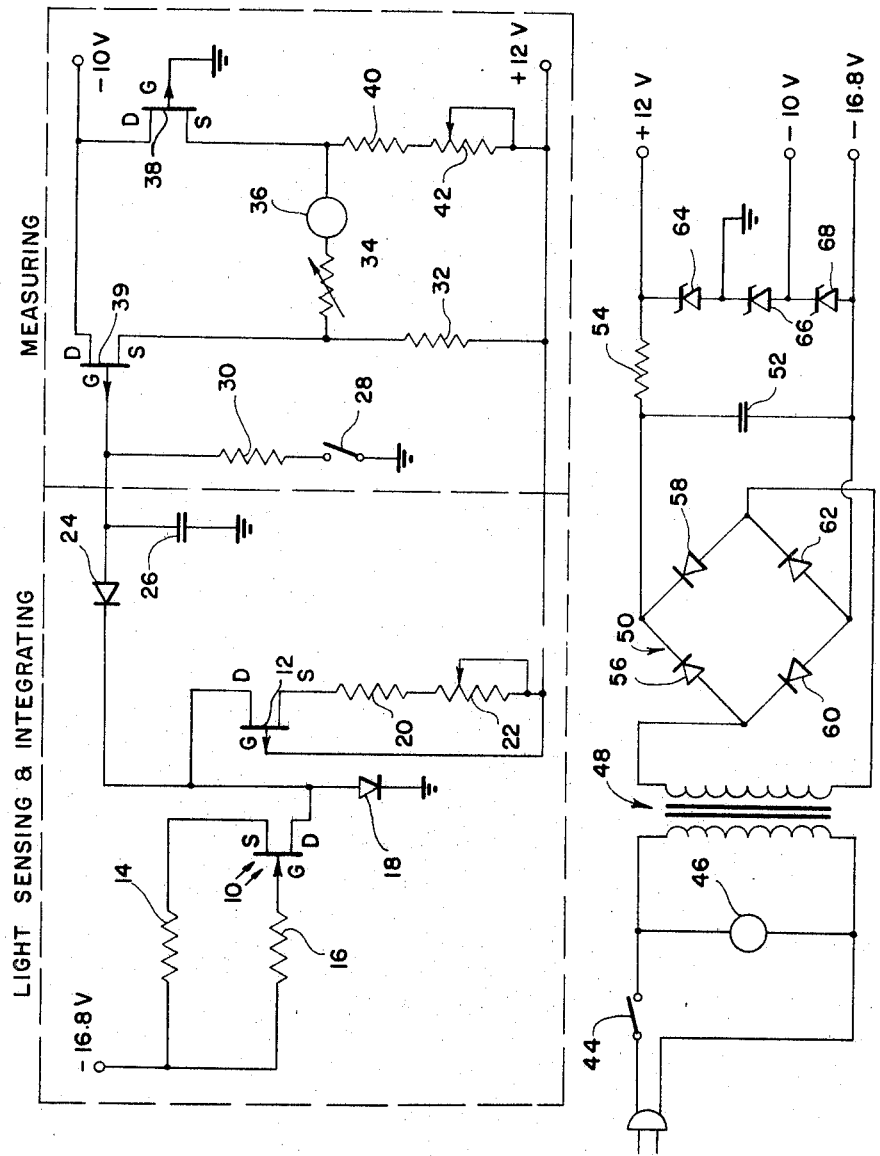
FIG. 1 is a circuit diagram, showing suggested components in a light energy integrating circuit embodying FET sensing and measuring circuitry.
FIG. 2 is a circuit diagram of a suggested regulated power source for the circuit of FIG. 1.

In FIG. 1 transistor 10 is mounted in the film plane of the camera. In the absence of light a dark current as shown in FIG. 4 flows through transistor 10. The current is determined by resistor 14 and thermal leakage current through resistor 16. This dark current must be cancelled out otherwise it will flow through diode 24 and charge capacitor 26. Transistor 12, which is connected in a source follower configuration (as is transistor 10), supplies a balancing dark current which is independent of small voltage changes at its drain. As is shown in FIG. 3a the balancing dark current from transistor 12 is made slightly greater than the dark current from transistor 10. Transistor 12 dark current is set by R20 plus R22. The excess current is diverted through diode 18 to ground. This stabilizes the dark voltage at the drains of transistors 10 and 12 at about plus .3 volt with respect to ground. FIG. 3a shows the current pulse generated by a light pulse through the shutter in transistor 10. This excess current will tend to cause the drain voltage to go negative with respect to ground, therefore the current is diverted through diode 24 and is stored in capacitor 26 (which is a low leakage type). As can be seen, the charge in capacitor 26 is representative of the integrated pulse of light.

The peak current flowing through transistor 10 (neglecting dark current) during a shutter operation is determined by drain-gate, light leakage current × resistor 16. By proper selection of resistors and capacitors a great many ranges of peak light intensities and time durations may be accommodated.

The measuring circuit of FIG. 1 is used to measure the voltage on capacitor 26. Resistor 30 and switch 28 are used to discharge capacitor 26, prior to making a measurement. With capacitor 26 discharged the gate of transistor 39 is at ground as is the gate of transistor 38. The voltages at their sources are made equal so that there is no deflection of meter 36 by means of adjusting resistor 42.

Figure 3:
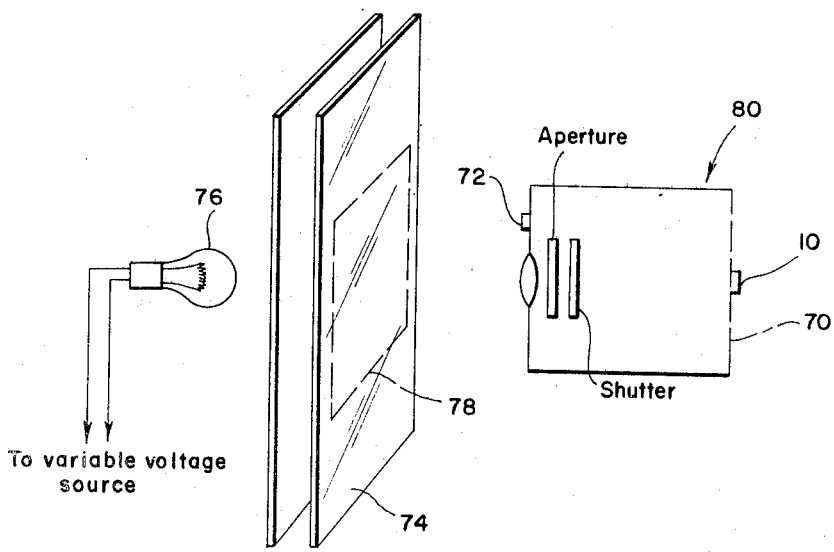
FIG. 3 is a diagrammatic view showing the positioning of uniform illuminance elements with respect to the camera and light sensing elements.
Figure 4:
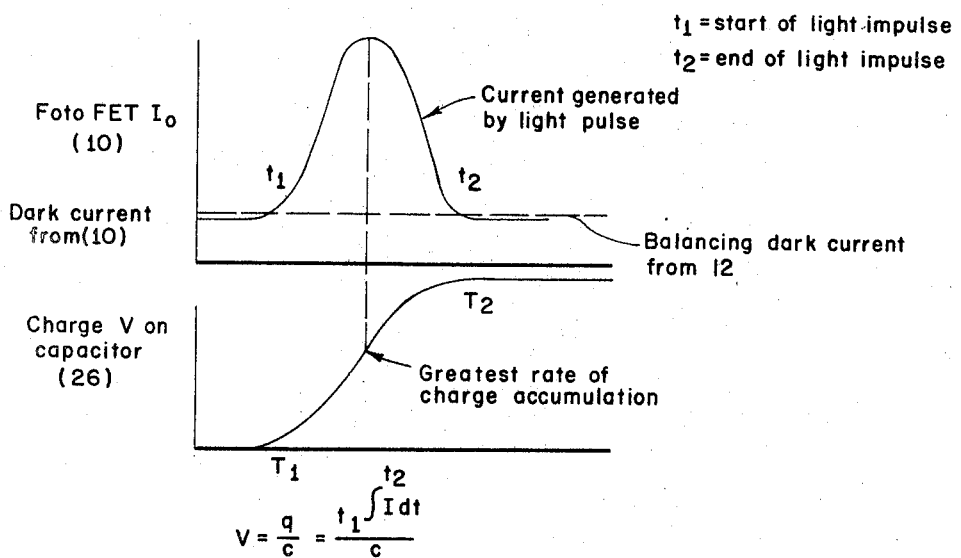
FIG. 4 is a diagrammatic view correlating the timing of the light pulse hitting the film plane with respect to the charge on capacitor 26 and showing the formula for calculating the charge V on capacitor 26.

Referring to FIG. 3 the FOTOFET is in the film plane 70 and the field of view 78 of conventional pick up cell 72 of the aperture control and the field of view 78 of camera 80 are filled by the uniform illuminance panel 74 which may be of the glass diffuse type. Camera 80 may include conventional lens 82, aperture 84 and shutter elements 86. The voltage from the variable voltage source (not illustrated) is increased until the light level at 76 is sufficient for proper aperture control operation.

The ASA setting of the camera should be the same as the ASA setting on the instrument (resistor 34).

For an operation the sense head is supported in an appropriate fixture and then inserted into the film compartment of the camera. The camera is placed in front of the light panel. The light panel 74 illustrated in FIG. 3 is brought up to the illuminance level that will permit normal operation of the aperture control. Any level of illuminance will be satisfactory if it falls between the upper and lower limits of the aperture control.

Power is turned on and the instrument is given a minute to stabilize.

Prior to operating the shutter, check the meter 36 for a zero reading. If it is not zero, push the reset button on switch 28. Then, push the camera shutter release. Meter 36 should read mid-scale for a proper exposure. Readings of full scale and ¼ scale represent an overexposure of 1 ev. and an underexposure of 1 ev., respectively.

Power supply includes on-off switch 44, panel light 46, transformer 48 and bridge 50 having four diodes 56, 58, 60 and 62. Direct current flows from capacitor 52 through fixed resistor 54 through Zener diodes 64, 66, and 68 to provide regulated voltages to the circuit, as indicated.

Manifestly, various resistor, capacitor and rectifier means may be employed in this circuit without departing from the spirit of invention, as defined in the claims.

What is claimed is:

1. A system for measuring the quantity of light impinging upon the film plane within a camera during shutter operation comprising:
   (A) a current source;
   (B) a uniform light source powered by said current source and mounted exteriorly of said camera in a position to direct light onto the film plane when the shutter is open; and
   (C) a testing circuit powered by said current source and including:
      (i) a light sensing portion having:
         (a) a first photo field effect transistor mounted in the film plane of said camera;
         (b) a second field effect transistor connected to said first photofield effect transistor and selectively regulated to receive slightly more current than the first photo field effect transistor, so as to load first photo field effect transistor; and
      (ii) a light measuring portion powered by said current source and including:
         (a) capacitor means positioned so at to shunt voltage from said light sensing portion as representative of the total amount of light hitting first photo field effect transitor within the film plane of said camera; and
         (b) a pair of balanced field effect transistors positioned so as to receive voltage shunted from said light sensing portion by said capacitor, and a voltage meter interconnecting said pair of field effect transistors for measuring said voltage as a function of the quantity of light impinging upon the film plane of said camera.

2. A system for measuring quantity of light impinging upon the film plane within a camera during shutter operation as in claim 1, wherein said current source is a generator regulated by rectifiers to produce constant D.C. voltage.

3. A system for measuring the quantity of light impinging upon the film plane within a camera during shutter operation as in claim 1, said light sensing portion being grounded intermediate said first photo field effect transistor and said second field effect transistor, so as to enable a constant flow of current from said current source through said first photo field effect transistor.

4. A system for measuring the quantity of light impinging upon the film plane within a camera during shutter operation as in claim 2, said light sensing portion including a potentiometer positioned intermediate said current source and said second field effect transistor, so as to load said second field effect transistor with more current than said first photo field effect transistor.

5. A system for measuring the quantity of light impinging upon the film plane within a camera during shutter operation as in claim 4, including a potentiometer positioned in said light measuring portion so as to regulate the amount of current discharged into said pair of field effect transistors.

6. A system for measuring the quantity of light impinging upon the film plane within a camera during shutter operation as in claim 5, including variable resistor means for calibrating said meter; so that voltage shunted through said capacitor creates an imbalance between said pair of field effect transistors, said imbalance being readable as a function of the amount of light hitting the film plane of said camera.

(References on following page)

References Cited

UNITED STATES PATENTS

| | | |
|---|---|---|
| 1,244,159 | 10/1917 | Adsit. |
| 1,979,719 | 11/1934 | Weisse. |
| 2,944,190 | 7/1960 | Ost. |
| 3,100,429 | 8/1963 | Koch. |
| 3,296,462 | 1/1967 | Reddi. |
| 3,344,703 | 10/1967 | Milton. |

FOREIGN PATENTS

| | | |
|---|---|---|
| 1,143,904 | 10/1957 | France. |
| 819,075 | 10/1951 | Germany. |

JEWELL H. PEDERSEN, Primary Examiner

WARREN A. SKLAR, Assistant Examiner

U.S. Cl. X.R.

93—10; 250—214; 307—304, 311; 356—215, 226